United States Patent
Machado et al.

(10) Patent No.: US 10,970,486 B2
(45) Date of Patent: Apr. 6, 2021

(54) USING UNSTRUCTURED INPUT TO UPDATE HETEROGENEOUS DATA STORES

(71) Applicant: salesforce.com, inc., San Francisco, CA (US)

(72) Inventors: Michael Machado, San Francisco, CA (US); John Ball, San Francisco, CA (US); Thomas Archie Cook, Jr., Boulder, CO (US); Shashank Harinath, San Francisco, CA (US); Roojuta Lalani, Fremont, CA (US); Zineb Laraki, San Francisco, CA (US); Qingqing Liu, San Francisco, CA (US); Mike Rosenbaum, San Francisco, CA (US); Karl Ryszard Skucha, Sunnyvale, CA (US); Jean-Marc Soumet, San Jose, CA (US); Manju Vijayakumar, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 145 days.

(21) Appl. No.: 16/134,956

(22) Filed: Sep. 18, 2018

(65) Prior Publication Data
US 2020/0089757 A1 Mar. 19, 2020

(51) Int. Cl.
*G06F 40/295* (2020.01)
*G06F 16/332* (2019.01)
(Continued)

(52) U.S. Cl.
CPC ........ *G06F 40/295* (2020.01); *G06F 16/3329* (2019.01); *G06F 40/30* (2020.01);
(Continued)

(58) Field of Classification Search
USPC .................................................. 704/1–504
See application file for complete search history.

(56) References Cited

U.S. PATENT DOCUMENTS

| 7,730,478 B2 | 6/2010 | Weissman |
| 7,779,039 B2 | 8/2010 | Weissman et al. |

(Continued)

FOREIGN PATENT DOCUMENTS

EP 3208755 A1 8/2017

OTHER PUBLICATIONS

International Search Report and Written Opinion from PCT Patent Application No. PCT/US2019/049812, dated Dec. 20, 2019, pp. 1-13.

*Primary Examiner* — Marcus T Riley
(74) *Attorney, Agent, or Firm* — Haynes and Boone, LLP

(57) ABSTRACT

Approaches to using unstructured input to update heterogeneous data stores include receiving unstructured text input, receiving a template for interpreting the unstructured text input, identifying, using an entity classifier, entities in the unstructured text input, identifying one or more potential parent entities from the identified entities based on the template, receiving a selection of a parent entity from the one or more potential parent entities, identifying one or more potential child entities from the identified entities based on the template and the selected parent entity, receiving a selection of a child entity from the one or more potential child entities, identifying an action item in the unstructured text input based on the identified entities and the template, determining, using an intent classifier, an intent of the action item, and updating a data store based on the determined intent, the identified entities, and the selected child entity.

17 Claims, 6 Drawing Sheets

(51) Int. Cl.
  *G06F 40/30* (2020.01)
  *G10L 15/18* (2013.01)
  *G10L 15/22* (2006.01)
  *G10L 15/30* (2013.01)

(52) U.S. Cl.
  CPC .......... *G10L 15/1815* (2013.01); *G10L 15/22* (2013.01); *G10L 15/30* (2013.01)

(56) References Cited

U.S. PATENT DOCUMENTS

| | | | |
|---|---|---|---|
| 9,442,778 B2 | 9/2016 | Desai et al. | |
| D776,682 S | 1/2017 | Kim et al. | |
| D784,397 S | 4/2017 | Kim et al. | |
| D784,409 S | 4/2017 | Kim et al. | |
| D808,985 S | 1/2018 | Kim et al. | |
| 9,881,076 B2 | 1/2018 | Louie et al. | |
| D809,556 S | 2/2018 | Kim et al. | |
| 10,146,581 B2 | 12/2018 | Rapp et al. | |
| 10,146,597 B2 | 12/2018 | Pack, III et al. | |
| 10,148,640 B2 | 12/2018 | Desai et al. | |
| 10,198,432 B2* | 2/2019 | Mikhaylov | G06F 40/30 |
| 10,282,663 B2* | 5/2019 | Socher | G06F 30/00 |
| 10,341,279 B2 | 7/2019 | Seymour et al. | |
| 10,346,721 B2 | 7/2019 | Albright et al. | |
| 10,353,905 B2* | 7/2019 | Ramachandran | G06F 16/81 |
| 10,354,264 B2* | 7/2019 | Jagota | G06Q 10/06315 |
| 10,474,709 B2 | 11/2019 | Paulus | |
| 10,521,465 B2 | 12/2019 | Paulus | |
| 10,599,775 B2* | 3/2020 | Visel | G06F 40/30 |
| 2008/0235199 A1* | 9/2008 | Li | G06F 16/243 |
| 2011/0320411 A1* | 12/2011 | Henderson | G06F 16/27 707/687 |
| 2016/0140355 A1 | 5/2016 | Jagota et al. | |
| 2016/0350653 A1* | 12/2016 | Socher | G06N 5/04 |
| 2017/0024645 A1* | 1/2017 | Socher | G06F 16/3329 |
| 2017/0032280 A1 | 2/2017 | Socher et al. | |
| 2017/0060919 A1* | 3/2017 | Ramachandran | G06F 16/258 |
| 2017/0070557 A1 | 3/2017 | Kim et al. | |
| 2017/0097742 A1 | 4/2017 | Kim et al. | |
| 2017/0140240 A1 | 5/2017 | Socher et al. | |
| 2017/0278514 A1* | 9/2017 | Mathias | G10L 15/22 |
| 2017/0316361 A1 | 11/2017 | Jagota et al. | |
| 2018/0032507 A1* | 2/2018 | Mikhaylov | G06F 40/211 |
| 2018/0082171 A1 | 3/2018 | Merity et al. | |
| 2018/0096219 A1 | 4/2018 | Socher | |
| 2018/0097880 A1* | 4/2018 | Chan | H04L 67/1097 |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129737 A1 | 5/2018 | Louie et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0217982 A1* | 8/2018 | Visel | G06F 40/30 |
| 2018/0225317 A1 | 8/2018 | Lalani et al. | |
| 2018/0268287 A1* | 9/2018 | Johansen | G06K 9/6268 |
| 2018/0268298 A1* | 9/2018 | Johansen | G06F 40/30 |
| 2018/0300317 A1 | 10/2018 | Bradbury | |
| 2018/0300400 A1 | 10/2018 | Paulus | |
| 2018/0307709 A1 | 10/2018 | Lalani et al. | |
| 2018/0307737 A1 | 10/2018 | Lalani et al. | |
| 2018/0336198 A1 | 11/2018 | Zhong et al. | |
| 2018/0336453 A1 | 11/2018 | Merity et al. | |
| 2018/0349359 A1 | 12/2018 | McCann et al. | |
| 2018/0357100 A1 | 12/2018 | Lalani et al. | |
| 2018/0365228 A1* | 12/2018 | Galitsky | G06N 5/022 |
| 2018/0373682 A1 | 12/2018 | McCann et al. | |
| 2018/0373987 A1 | 12/2018 | Zhang et al. | |
| 2019/0130206 A1 | 5/2019 | Trott et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0130897 A1 | 5/2019 | Zhou et al. | |
| 2019/0138946 A1* | 5/2019 | Asher | G06N 20/20 |
| 2019/0147076 A1 | 5/2019 | Yang et al. | |
| 2019/0149834 A1 | 5/2019 | Zhou et al. | |
| 2019/0188568 A1 | 6/2019 | Keskar et al. | |
| 2019/0220530 A1 | 7/2019 | Motwani et al. | |
| 2019/0228363 A1 | 7/2019 | Badarinath et al. | |
| 2019/0236504 A1 | 8/2019 | Lalani et al. | |
| 2019/0251168 A1 | 8/2019 | McCann et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |
| 2019/0272335 A1 | 9/2019 | Liu et al. | |
| 2020/0089757 A1* | 3/2020 | MacHado | G06F 40/295 |

* cited by examiner

600

- 610 — Name: Debrief
- 620 — Parent: Account
- 630 — Child: Opportunity
- 640 — Action Item(s): Event Creation, Opportunity Update, Task Creation
- 650 — Target Object Filter: StageName != 'Closed' ORDER BY Name ASC

- 662 — Opportunity Update {Monetary: Amount}
- 664 — Opportunity Update {Date: CloseDate}
- 666 — Opportunity Update {PickList: StageName}
- 668 — Task Creation {Person: Contact, Date: FollowupDate}

- 670 — Allow Task Creation: Yes
- 680 — Allow Event Creation: Yes
- 690 — Allow Publication: Yes

710 — Met with Chris Quintana of Acme for lunch at Chez Cuisine today.

720 — Acme is a B2B logistics organization that is expanding their global presence.

730 — Acme Corp's timeline for purchasing marketing software is coming up.

740 — * Timeline for purchasing is July 1st.

750 — * May purchase up to $250k of product.

760 — We showed a comparison between our product and ABC's product providing a clear reason to choose us.

770 — * Follow up call with Chris in two weeks.

*FIG. 7*

USING UNSTRUCTURED INPUT TO UPDATE HETEROGENEOUS DATA STORES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to database systems, and more specifically to a system and method for updating heterogeneous data stores using unstructured input.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art.

Computer and software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a user-developed application so that a user (e.g., consumer of cloud-based services) no longer needs to operate and support dedicated server hardware. The cloud computing model can often provide substantial cost savings to the user over the life of the application because the user no longer needs to provide dedicated network infrastructure, electrical and temperature controls, physical security and other logistics in support of dedicated server hardware.

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.). In one example, the cloud platform may support customer relationship management (CRM) solutions. This may include support for sales, service, marketing, community, analytics, applications, and the Internet of Things (IoT).

It is not uncommon for a multi-tenant database system to store data for different tenants according to tenant-specific schemas and/or data arrangements. This creates a database that encompasses multiple data stores that are heterogeneous because each of the data stores store different information according to the different schemas and/or data arrangements. This presents a challenge to both users and developers as the users are often constrained to enter new data and/or specify data changes using a structured approach built around a user interface that is typically constrained by the schema of the underlying data store.

Accordingly, it would be advantageous to have improved methods and systems that users may use to specify additions and/or changes to data and, more specifically, methods and systems that allow users to specify the additions and/or changes using unstructured input.

BRIEF DESCRIPTION OF THE DRAWINGS

FIG. 6 is a simplified diagram of an example template for interpreting unstructured input according to some embodiments.

FIG. 7 is a simplified diagram of an example of unstructured natural language input according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Figure 1:
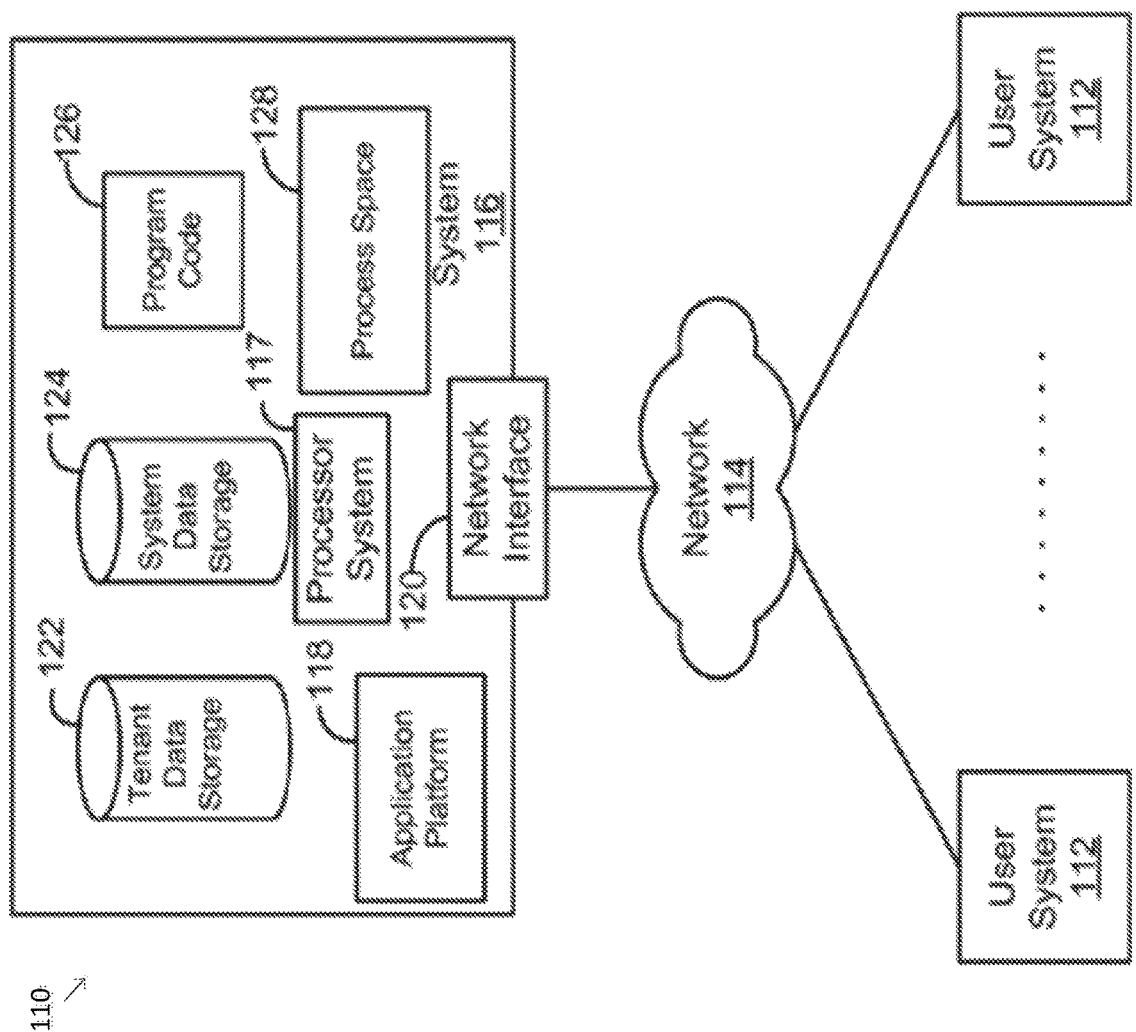
FIG. 1 is a simplified diagram of a computing system according to some embodiments.

FIG. 1 is a simplified diagram of a computing system 110 according to some embodiments. As shown in FIG. 1, computing system 110 includes user systems 112, network 114, database system 116, processor system 117, application platform 118, network interface 120, tenant data storage 122, system data storage 124, program code 126, and process space 128 for executing database system processes and tenant-specific processes, such as running applications as part of an application hosting service. In some embodiments, computing system 110 may not have all of the components listed and/or may have other elements instead of, or in addition to, those listed above.

In some embodiments, the computing system 110 provides an on-demand database service for multiple users and/or tenants. A user system 112 may be any machine or system that is used by a user to access a database user system. In some examples, any of user systems 112 may be a handheld computing device, a mobile phone, a laptop computer, a notepad computer, a work station, a network of computing devices, and/or the like. As illustrated in FIG. 1 (and in more detail in FIG. 2) user systems 112 might interact via a network 114 with an on-demand database service, which is database system 116.

An on-demand database service, such as that which can be implemented using the database system 116, is a service that is made available to users outside of the enterprise(s) that own, maintain or provide access to the database system 116. As described above, such users do not have to be concerned with building and/or maintaining the database system 116. Instead, resources provided by the database system 116 may be available for use by the users when the users need services provided by the database system 116 (e.g., on the demand of the users). Some on-demand database services may store information from one or more tenants stored into tables of a common database image to form a multi-tenant database system (MTS). Accordingly, the "on-demand database service 116" and the "database system 116" will be used interchangeably herein. The term "multi-tenant database system" can refer to those systems in which various elements of hardware and/or software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) and/or the equivalent may execute storage and retrieval of information against the data base object(s).

The application platform 118 may be a framework that allows the applications of database system 116 to run, such as the hardware and/or software infrastructure, such as the operating system. In some embodiments, on-demand database service 116 may include an application platform 118 that enables creating, managing, and/or executing of one or more applications developed by the provider of the on-demand database service, users accessing the on-demand database service via user systems 112, and/or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with database system 116, that user system 112 has the capacities allotted to that salesperson. However, while an administrator is using that user system 112 to interact with database system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 MAY be any one or any combination of one or more local area networks (LANs), one or more wide area networks (WANs), one or more telephone networks, one or more wireless networks, one or more point-to-point networks, one or more star networks, one or more token ring networks, one or more hub networks, and/or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that network 114 is not so limited and other network protocols may be supported.

User systems 112 may communicate with database system 116 using TCP/IP and, at a higher network level, use other common Internet protocols to communicate. Such as one or more of hypertext transfer protocol (HTTP), file transfer protocol (FTP), Andrew file system (AFS), wireless application protocol (WAP), and/or the like. In some examples where HTTP is used, user system 112 may include an HTTP client commonly referred to as a "browser" for sending and receiving HTTP messages to and from an HTTP server at database system 116. Such an HTTP server might be implemented as the sole network interface between database system 116 and network 114, but other techniques might be used as well and/or instead. In some implementations, the interface between database system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, database system 116 as shown in FIG. 1, implements a web-based customer relationship management (CRM) system. In some embodiments, database system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In some embodiments, database system 116 implements applications other than, or in addition to, a CRM application. In some examples, database system 116 may provide tenant access to multiple hosted (standard and custom) applications, including a CRM application. User and/or third party developer applications, which may or may not include CRM, may be supported by the application platform 118, which manages creation, storage of the applications into one or more database objects, and/or executing of the applications in a virtual machine in the process space of the database system 116.

One arrangement for elements of database system 116 is shown in FIG. 1, including network interface 120, application platform 118, tenant data storage 122 for tenant data 123, system data storage 124 for system data 125 accessible to database system 116 and possibly multiple tenants, program code 126 for implementing various functions of the database system 116, and process space 128 for executing MTS system processes and tenant-specific processes, such as running applications as part of an application hosting service. Additional processes that may execute on database system 116 include database indexing processes.

Several elements in computing system 110 as shown in FIG. 1 include conventional, well-known elements that are explained only briefly here. For example, each of the user systems 112 may include a desktop personal computer, workstation, laptop, notepad computer, PDA, cell phone, or any wireless access protocol (WAP) enabled device or any other computing device capable of interfacing directly or indirectly to the Internet or other network connection. Each of user systems 112 typically runs an HTTP client (e.g., a browsing program, such as Microsoft's Internet Explorer browser, Netscape's Navigator browser, Opera's browser, a WAP-enabled browser in the case of a cell phone, notepad computer, PDA or other wireless device, and/or the like) allowing a user (e.g., subscriber of the multi-tenant database system) of the user systems 112 to access, process, and/or view information, pages, and/or applications available to it from database system 116 over network 114. Each of user systems 112 also typically includes one or more user interface devices (e.g., a keyboard, a mouse, trackball, touch pad, touch screen, pen, and/or the like) for interacting with a graphical user interface (GUI) provided by the browser on a display (e.g., a monitor screen, liquid crystal display (LCD) monitor, light emitting diode (LED) monitor, organic light emitting diode (OLED) monitor, and/or the like) in conjunction with pages, forms, applications, and/or other information provided by database system 116 and/or other systems and/or servers. In some examples, the user interface device may be used to access data and/or applications hosted by database system 116, to perform searches on stored data, and/or allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN, and/or the like.

According to some embodiments, each of user systems 112 and its components are operator configurable using applications, such as a browser, including computer code run using a central processing unit such as an Intel Pentium® processor or the like. Similarly, database system 116 (and additional instances of an MTS, where more than one is present) and their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring database system 116 to intercommunicate and/or to process webpages, applications and/or other data and media content as described herein are preferably downloaded and stored on a hard disk, but the entire program code, or portions thereof, may also be stored in any other volatile or non-volatile memory medium or device as is well known, such as is read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium (e.g., over the Internet and/or from another server, as is well known) and/or transmitted over any other conventional network connection as is well known (e.g., extranet, virtual private network (VPN), LAN, and/or the like) using any communication medium and/or protocols (e.g., TCP/IP, HTTP, HTTPS, Ethernet, and/or the like) as are well known. It will also be appreciated that computer code for implementing embodiments of the present invention may be implemented in any programming language that is executable on a client system and/or server or server system such as, for example, C, C++, HTML, any other markup language, Java™, JavaScript, ActiveX, any other scripting language (e.g., VBScript), and/or many other programming languages as are well known may be used. (Java™ is a trademark of Sun MicroSystems, Inc.).

According to some embodiments, database system 116 is configured to provide webpages, forms, applications, data, and/or media content to the user (client) systems 112 to support the access by user systems 112 as tenants of database system 116. As such, database system 116 provides security mechanisms to keep each tenant's data separate unless the data is shared. If more than one MTS is used, they may be located in close proximity to one another (e.g., in a server farm located in a single building and/or campus), and/or they may be distributed at locations remote from one another (e.g., one or more servers located in city A and/or one or more servers located in city B). In some embodiments, each MTS may include one or more logically and/or physically connected servers distributed locally and/or across one or more geographic locations. Additionally, the term "server" is meant to include a computer system, including processing hardware and process space(s), and an associated storage system and database application (e.g., object oriented data base management system (OODBMS) or rational database management system (RDBMS)) as is well known in the art. It should also be understood that "server system" and "server" are often used interchangeably herein. Similarly, the database objects described herein may be implemented as single databases, a distributed database, a collection of distributed databases, and a database with redundant online and/or offline backups, other redundancies, and/or the like. In some examples, the database objects may be implemented using a distributed database and/or storage network and associated processing intelligence.

Figure 2:
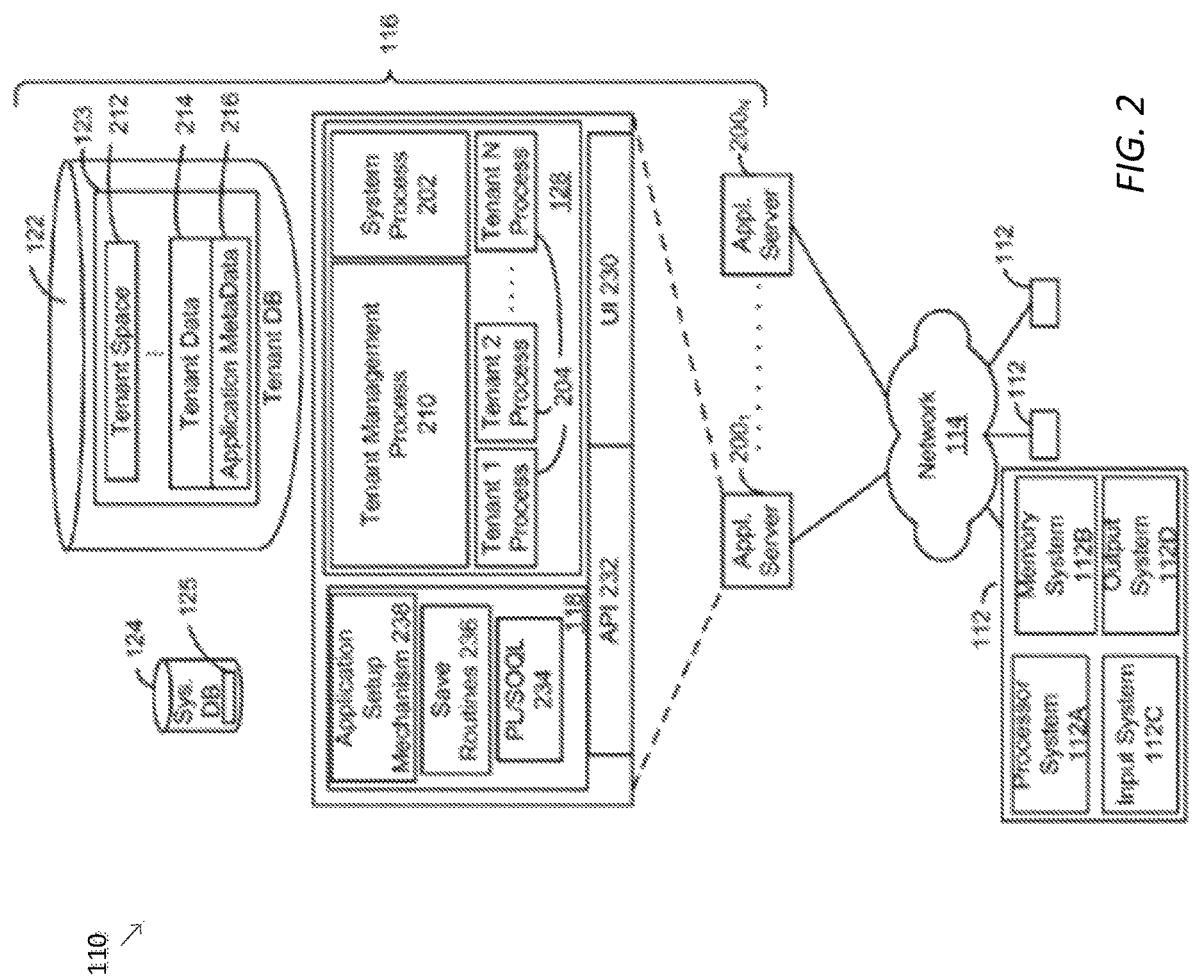
FIG. 2 is a simplified diagram of another computing system according to some embodiments.

FIG. 2 is a simplified diagram of computing system 110 according to additional embodiments. As shown in FIG. 2, each of user systems 112 may include a processor system 112A, a memory system 112B, an input system 112C, and an output system 112D. FIG. 2 additionally shows network 114 and database system 116. FIG. 2 also shows that database system 116 may include tenant data storage 122, tenant data 123, system data storage 124, system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In some embodiments, computing system 110 may not have the same elements as those listed above and/or may have other elements instead of, or in addition to, those listed above.

User systems 112, network 114, database system 116, tenant data storage 122, and system data storage 124 are described in further detail above with respect to FIG. 1. Regarding user systems 112, processor system 112A may be any combination of one or more processors, microprocessors, multicore processors, graphics processing units (GPUs), tensor processing units (TPUs), application-specific integrated circuits (ASICs), field-programmable gate arrays (FPGAs), and/or the like. Memory system 112B may include any combination of one or more memory devices, short term, and/or long term memory. In some examples, each of the one or more memory devices may include machine-readable media, such as floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Input system 112C may be any combination of input devices, such as one or more keyboards, mice, trackballs, scanners, cameras, interfaces to networks, and/or the like. Output system 112D may be any combination of output devices, such as one or more monitors, printers, interfaces to networks, and/or the like.

As shown in FIG. 2, database system 116 may include network interface 120 of FIG. 1 implemented as a set of HTTP application servers 200, application platform 118, tenant data storage 122, and/or system data storage 124. Also shown is system process space 202, including individual tenant process spaces 204 and tenant management process space 210. Each application server 200 may be configured to access tenant data storage 122 and the tenant data 123 therein and the system data storage 124 and the system data 125 therein to serve requests of user systems 112. In some examples, the tenant data 123 may be divided into individual tenant storage areas 212, which can be either a physical arrangement and/or a logical arrangement of data.

In some examples, within each tenant storage area 212, user storage 214 and application metadata 216 may be allocated for each user. In some examples, a copy of a user's most recently used (MRU) items may be stored in user storage 214. In some examples, a copy of MRU items for an entire organization (e.g., a tenant) me be stored to tenant storage area 212.

UI 230 provides a user interface and API 232 provides an application programmer interface to database system 116 resident processes and to users and/or developers at user systems 112. The tenant data 123 and the system data 125 may be stored in various databases, such as one or more Oracle™ databases.

Application platform 118 includes an application setup mechanism 238 that supports application developers' creation and/or management of applications. In some examples, application setup mechanism 238 may save metadata into tenant data storage 122 by save routines 236 for execution by subscribers as one or more tenant process spaces 204 managed by tenant management process 210. In some examples, invocations to such applications may be coded using PL/SOQL 234 that provides a programming language style interface extension to API 232. Some embodiments of PL/SOQL language are discussed in further detail in U.S. Pat. No. 7,730,478, filed Sep. 21, 2007, entitled, "Method and System for Allowing Access to Developed Applications via a Multi-Tenant On-Demand Database Service," which is incorporated herein by reference. In some examples, invocations to applications may be detected by one or more system processes, which manage retrieving application metadata 216 for the subscriber, making the invocation and executing the metadata as an application in a virtual machine.

Each application server 200 may be communicably coupled to database systems (e.g., having access to system data 125 and tenant data 123) via a different network connection. In some examples, one application server $200_1$ may be coupled via network 114, another application server $200_{N-1}$ may be coupled via a direct network link, and another application server $200_N$ may be coupled by yet a different network connection. TCP/IP includes typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between application servers 200 and user systems 112 to distribute requests to application servers 200. In some embodiments, the load balancer uses a least connections algorithm to route user requests to application servers 200. Other examples of load balancing algorithms, such as round robin, observed response time, and/or the like may also be used. In some embodiments, three consecutive requests from a same user could be handled by three different application servers 200, and three requests from different users could be handled by a same application server 200. In this manner, database system 116 is multi-tenant, wherein database system 116 handles storage of and/or access to different objects, data and/or applications across disparate users and/or organizations.

As an example of storage, one tenant might be a company that employs a sales force where each salesperson uses database system 116 to manage his or her sales process. Thus, a user might maintain contact data, leads data, customer follow-up data, performance data, goals progress data, and/or the like that are applicable to that user's personal sales process (e.g., in tenant data storage 122). In some examples of a MTS arrangement, a user may manage his or her sales efforts and cycles from any of many different user systems because the data and/or the applications to access, view, modify, report, transmit, calculate, and/or the like may be maintained and/or accessed by a user system 112 having nothing network access. In some examples, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there may be some data structures managed by database system 116 that are allocated at the tenant level while other data structures may be managed at the user level. Because a MTS might support multiple tenants including possible competitors, the MTS should additionally have security protocols that keep data, applications, and/or application use separate. Also, because many tenants may opt for access to a MTS rather than maintain their own system, redundancy, up-time, and/or backup are additional functions that may be implemented in the MTS. In addition to user-specific data and tenant specific data, database system 116 may also maintain system level data usable by multiple tenants and/or other data. Such system level data may include industry reports, news, postings, and/or the like that are sharable among tenants.

In certain embodiments, user systems 112 (which may be client systems) communicate with application servers 200 to request and/or update system-level and/or tenant-level data from database system 116 that may involve sending one or more queries to tenant data storage 122 and/or system data storage 124. Database system 116 (e.g., an application server 200 in database system 116) automatically generates one or more structured query language (SQL) statements (e.g., one or more SQL queries) that are designed to access and/or modify the desired information. System data storage 124 may generate query plans to access the requested data from the database.

Each database can generally be viewed as a collection of objects, such as a set of logical tables, containing data fitted into predefined categories as characterized by a schema. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table may describe a purchase order, including fields for information such as customer, product, sale price, date, etc. In some multi-tenant database systems, standard entity tables might be provided for use by all tenants. For CRM database applications, such standard entities might include tables for Account, Contact, Lead, and/or Opportunity data, each containing pre-defined fields. It should be understood that the word "entity" may also be used interchangeably herein with "object" and "table."

In some multi-tenant database systems, tenants may be allowed to create and store custom objects, and/or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In some embodiments, custom entity data rows characterized by custom schemas may be stored in a single multi-tenant physical table, which may contain multiple logical tables per organization. It is transparent to customers that their multiple "tables" are in fact stored in one large table or that their data may be stored in a same table as the data of other customers.

In some embodiments, one or more of the organizations may wish to access services or information that are provided by various vendors and/or service providers that are separate and distinct from the party operating the database system. The information and/or services provided by such a service provider may supplement and/or complement the services provided by the database system. In some examples where database system 116 provides customer relationship management (CRM) services to the organizations, other vendors and/or service providers (e.g., Dun & Bradstreet or InsideView) may offer competitive intelligence information.

One of the challenges in working with an information system and/or a database system, such as database system 116, is that the typical user does not know how the data is broken into and stored as objects or records in the underlying data store (e.g., within tenant data storage 122, system data storage 124, and/or the like). In some examples, this challenge may be further complicated in a multi-tenant system where different users, organizations, and/or tenants use different (e.g., heterogeneous) schemas for storing their respective data.

According to some embodiments, one solution to address this problem is for an application developer (who understands the underlying data storage schemas) to develop a custom user interface (e.g., as part of user interface 230) that solicits new and/or changed data from the user in a fill-in-the-blank matter. In some examples, this is costly and inefficient as each custom user interface may take significant resources to develop, test, and/or deploy. In some examples, this may also be inflexible because changes in an underlying schema may result in significant redevelopment costs for a custom user interface. In some examples, the users may also find this approach frustrating as the user is constrained to express the new data in an order, arrangement, and/or format as dictated by the developer through the custom user interface.

Accordingly, it would be advantageous to have improved data entry approaches that address one or more of these issues. One such approach is a data entry system that allows a user to provide unstructured input in the form of spoken or written natural language where the user is free to express the desired new data and/or changes to data using a freeform narrative. To aid in the processing of the unstructured input, a developer provides a template that helps the data entry system interpret the unstructured input as is described in further detail below. Further, because the template is much simpler to develop than an custom user interface, the development costs of different templates for different users, organizations, and/or tenants is significantly reduced in comparison to corresponding custom user interfaces.

Figure 3:
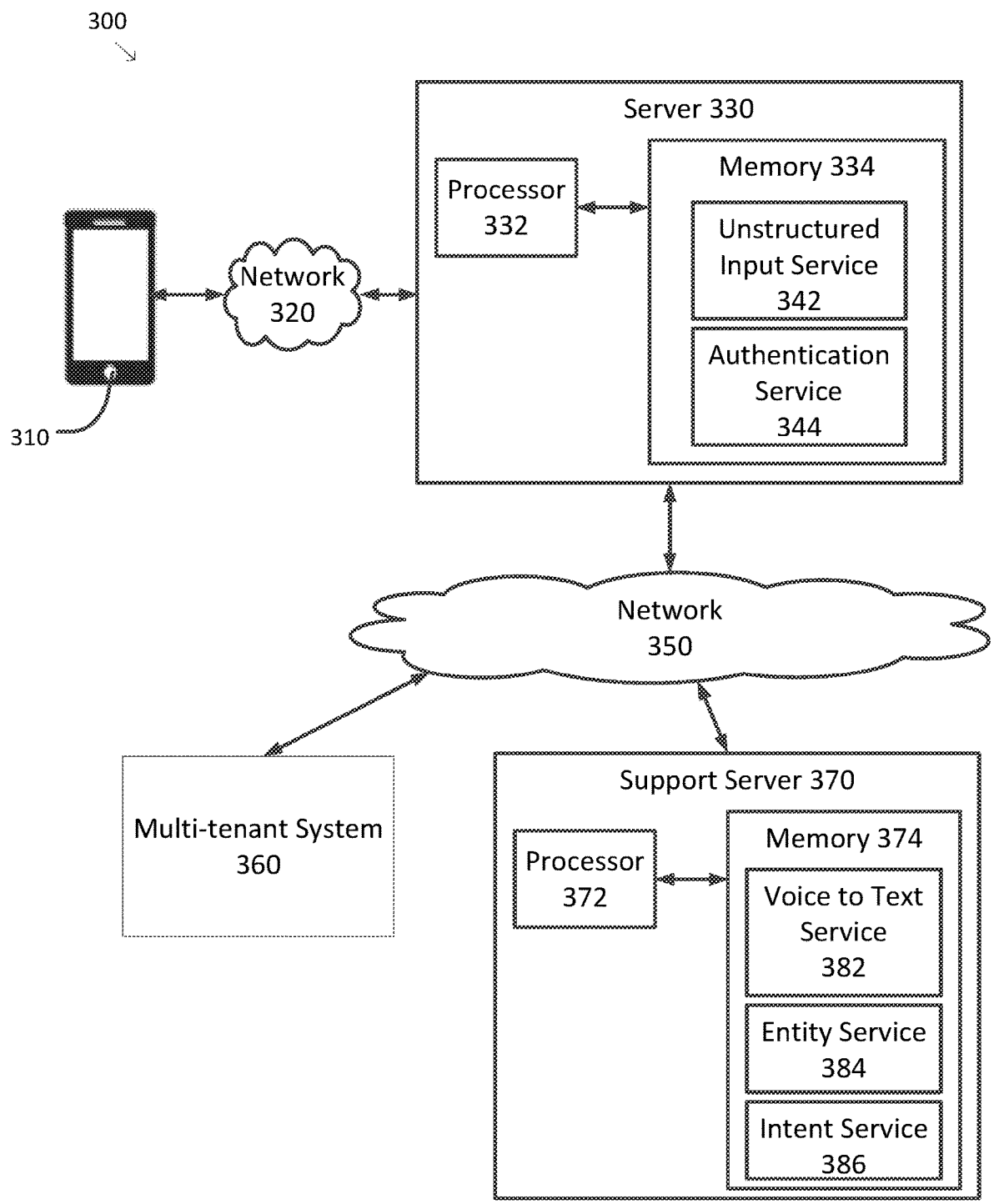
FIG. 3 is a simplified diagram of a computing system for supporting unstructured input according to some embodiments.

FIG. 3 is a simplified diagram of a computing system 300 for supporting unstructured input according to some embodiments. As shown in FIG. 3, users interact with computing system 300 via a user device 310. In some examples, user device 310 may be consistent with a smartphone and/or other portable computing device. In some examples, user device 310 may be consistent with one of user systems 112. In some examples, user device 310 may include one or more applications (e.g., a web browser and/or one or more custom applications) for accessing the services provided by computing system 300.

As shown, user device 310 is coupled via a network 320 to a server 330. In some examples, network 320 may include one or more sub-networks, such as a cellular network, a mesh network, a wireless network, a local area network, a wide area network, and/or the like. In some examples, network 320 may be consistent with network 114.

Server 330 includes a processor 332 coupled to memory 334. Operation of server 330 is controlled by processor 332. And although server 330 is shown with only one processor 332, it is understood that processor 332 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in server 330. Server 330 may be implemented as a stand-alone subsystem, as a board added to a computing device, and/or as a virtual machine.

Memory 334 may be used to store software executed by server 330 and/or one or more data structures used during operation of server 330. Memory 334 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 332 and/or memory 334 may be arranged in any suitable physical arrangement. In some embodiments, processor 332 and/or memory 334 may be implemented on a same board, in a same package (e.g., system-in-package), on a same chip (e.g., system-on-chip), and/or the like. In some embodiments, processor 332 and/or memory 334 may include distributed, virtualized, and/or containerized computing resources. Consistent with such embodiments, processor 332 and/or memory 334 may be located in one or more data centers and/or cloud computing facilities.

As shown, memory 334 includes an unstructured input service 342 and an authentication service 344. Unstructured input service 342 is responsible for receiving unstructured input from the user of user device 310, analyzing the unstructured input using a template, and making one or more updates to a database or data store based on the analysis of the unstructured input as is described in further detail below. Authentication service 344 provides authentication support for authenticating users and/or user devices (e.g., user device 310) to prevent authorized access to unstructured input service 342 and/or the underlying databases or data stores. In some examples, authentication service 344 receives one or more credentials from a user and/or a user device (e.g., username, password, authentication token, and/or the like) to authenticate the user and/or the user device. In some examples, authentication service 344 may facilitate access by the user and/or unstructured input service 342 to the underlying databases and/or data stores, such as by generating one or more database connection strings and/or the like.

In some examples, memory 334 may include non-transitory, tangible, machine readable media that includes executable code that when run by one or more processors (e.g., processor 332) may cause the one or more processors to perform one or more processes associated with unstructured input service 342 and/or authentication service 344 as is described in further detail below. In some examples, unstructured input service 342 and/or authentication service 344 may be implemented using hardware, software, and/or a combination of hardware and software. In some examples, unstructured input service 342 and/or authentication service 344 may include one or more APIs, web services, and/or the like (e.g., a HTTP service) for providing user applications with access to the services of unstructured input service 342 and/or authentication service 344.

Server 330 and the services hosted by server 330 (e.g., unstructured input service 342, authentication service 344, and/or the like) are coupled via a network 350 to a multi-tenant system 360 and a support server 370. In some examples, network 350 may include one or more sub-networks, such as a cellular network, a mesh network, a wireless network, a local area network, a wide area network, and/or the like. In some examples, network 350 may be consistent with network 114.

Multi-tenant system 360 includes the computing devices and infrastructure (e.g., one or more processors, one or more storage devices, one or more platforms, one or more processes, and/or the like) for providing server 330 and unstructured input service 342 with access to one or multi-tenant databases and/or data stores. In some examples, multi-tenant system 360 may be consistent with database system 116 as described previously with respect to FIGS. 1 and/or 2.

Support server 370 includes a processor 372 coupled to memory 374. Operation of support server 370 is controlled by processor 372. And although support server 370 is shown with only one processor 372, it is understood that processor 372 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in support server 370. Support server 370 may be implemented as a stand-alone subsystem, as a board added to a computing device, and/or as a virtual machine.

Memory 374 may be used to store software executed by support server 370 and/or one or more data structures used during operation of support server 370. Memory 374 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 372 and/or memory 374 may be arranged in any suitable physical arrangement. In some embodiments, processor 372 and/or memory 374 may be implemented on a same board, in a same package (e.g., system-in-package), on a same chip (e.g., system-on-chip), and/or the like. In some embodiments, processor 372 and/or memory 374 may include distributed, virtualized, and/or containerized computing resources. Consistent with such embodiments, processor 372 and/or memory 374 may be located in one or more data centers and/or cloud computing facilities.

As shown, memory 374 includes a voice to text service 382, an entity service 384, and an intent service 386. Voice to text service 382 receives an audio file (e.g., a MP3 file, and/or the like) and applies one or more speech recognition algorithms to the audio file to generate a natural language text string corresponding to the spoken words recognized in the audio file. In some examples, voice to text service 382 may utilize one or more neural networks trained to recognize speech in audio data. In some examples, voice to text service 382 may utilize one or more commonly available speech recognition libraries and/or APIs.

Entity service 384 receives a natural language text string (e.g., as output by voice to text service 382) and parses the words and/or the phrases in the natural language text string to identify one or more entities, determine a position of each of entities within the natural language text string, determine a type of each of the entities, a value for each of the entities, and/or determine a confidence level corresponding to how well entity service 384 believes it has recognized a corresponding entity and/or a type of the corresponding entity. In some examples, entity service 384 is able to recognize entities that correspond to organizations (e.g., a company), persons, monetary amounts, percentages, dates, times, locations, and/or pick-list types. In some examples, the pick-list types may correspond to an enumeration, a set of states for an object and/or entity, and/or the like. In some examples, entity service 384 may utilize one or more neural network classifiers (e.g., a hierarchical neural network classifier) to determine the type, the value, and/or the confidence level for each of the recognized entities. In some examples, entity service 384 may utilize one or more entity recognition models for recognizing the entities, their types, their values, and their confidence levels based on a regular expression and/or other text parsing scheme. In some examples, entity service 384 utilizes a hybrid structure that includes both neural network structures and entity recognition models. Examples of implementations for entity service 384 may be found in concurrently filed U.S. patent application with attorney docket number A4125US2/70689.41US01 entitled "Systems and Methods for Named Entity Recognition", which is incorporated by reference herein.

Intent service 386 receives a natural language text string (e.g., as output by voice to text service 382) and parses the words and/or the phrases in the natural language text string to determine a desired intent of the natural language text string and/or a confidence in that determination. In some examples, the intent may be selected from a class of intents associated with desired data changes to a database and/or data store. In some examples, the class of intents may include one or more of inserting an entry (e.g., a record) in a database table, updating one or more fields of an entry (e.g., a record) in a database table, and/or the like. In some examples, intent service 386 may utilize one or more neural network classifiers to determine the intent and/or confidence level for the determined intent. Examples of implementations for intent service 386 may be found in concurrently filed U.S. patent application with attorney docket number A4125US3/70689.40US01 entitled "Determining Intent from Unstructured Input to Update Heterogeneous Data Stores", which is incorporated by reference herein.

In some examples, memory 374 may include non-transitory, tangible, machine readable media that includes executable code that when run by one or more processors (e.g., processor 372) may cause the one or more processors to perform one or more processes associated with voice to text service 382, entity service 384, and/or intent service 386 as is described in further detail below. In some examples, voice to text service 382, entity service 384, and/or intent service 386 may be implemented using hardware, software, and/or a combination of hardware and software. In some examples, voice to text service 382, entity service 384, and/or intent service 386 may include one or more APIs, web services, and/or the like (e.g., a HTTP service) for providing user applications and/or other services (e.g., unstructured input service 342) with access to the services of voice to text service 382, entity service 384, and/or intent service 386.

As discussed above and further emphasized here, FIG. 3 is merely an example which should not unduly limit the scope of the claims. One of ordinary skill in the art would recognize many variations, alternatives, and modifications. According to some embodiments, other configurations and arrangements of computing system 300 are possible. In some examples, server 330 and/or support server 370 may be part of multi-tenant system 360. In some examples, one or more of the services hosted in server 330 and/or support server 370 may be hosted in separate servers. In some examples, network 320 and network 350 may be a same network. In some examples, network 350 may include two or more separate networks.

Figure 4:
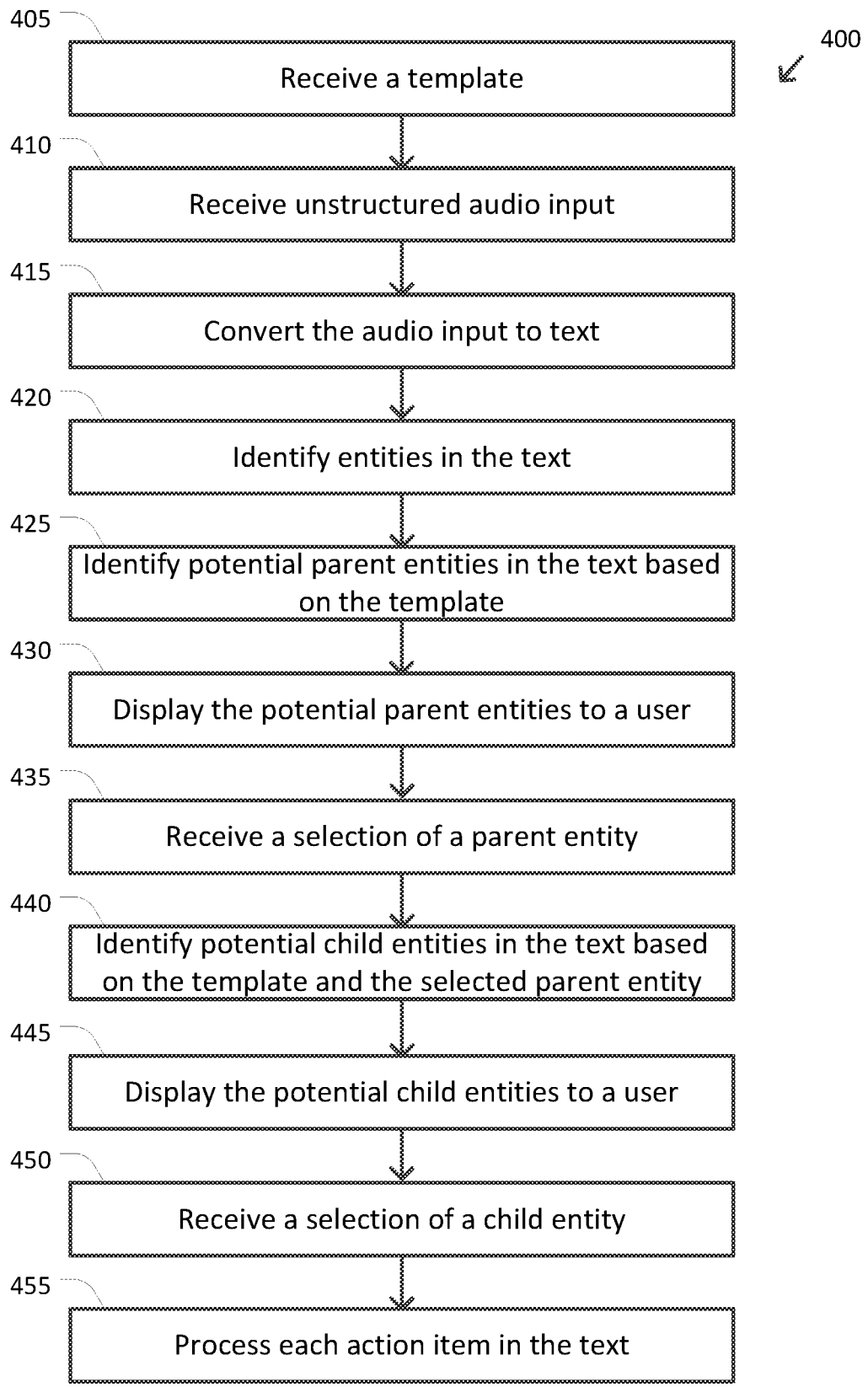
FIG. 4 is a simplified diagram of a method of processing unstructured input according to some embodiments.
Figure 5:
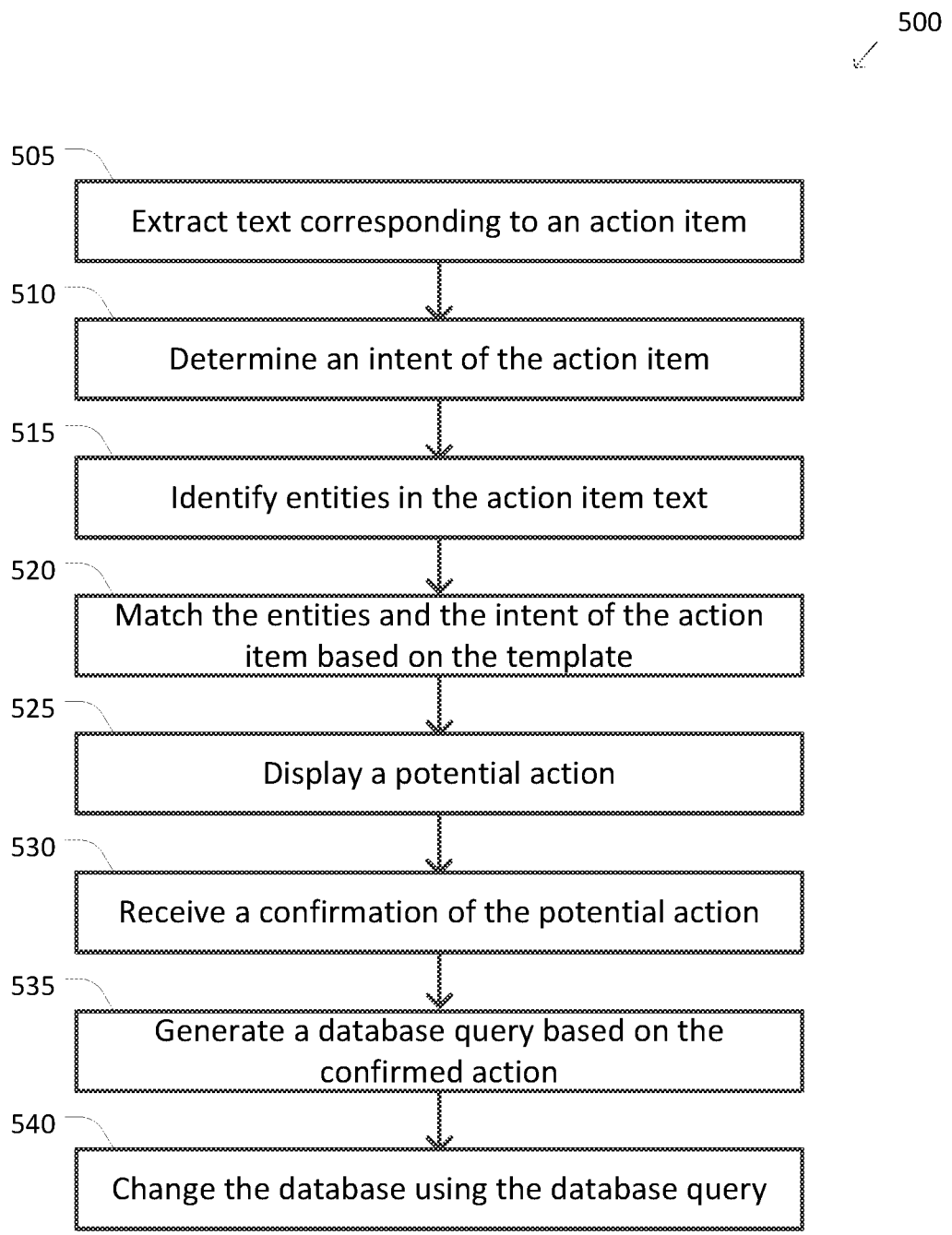
FIG. 5 is a simplified diagram of a method of processing an action item according to some embodiments.

FIG. 4 is a simplified diagram of a method 400 of processing unstructured input according to some embodiments and FIG. 5 is a simplified diagram of a method 500 of processing an action item according to some embodiments. One or more of the processes 405-455 of method 400 and/or the processes 500-580 of method 500 may be implemented, at least in part, in the form of executable code stored on non-transitory, tangible, machine-readable media that when run by one or more processors may cause the one or more processors to perform one or more of the processes 405-455 and/or 505-580. In some embodiments, method 400 and/or 500 may be used as a service and/or combination of services for receiving unstructured audio input that includes natural language, analyzing the natural language in the unstructured audio input according to a template, and guiding a user in identifying database records that are the subject of the natural language, and preparing and has executed one or more changes to the identified database records. In some examples, at least some of the processes of methods 400 and/or 500 may be performed by one or more services, such as unstructured input service 342, voice to text service 382, entity service 384, and/or intent service 386.

According to some embodiments, methods 400 and 500 are described in conjunction with the examples of FIGS. 6 and 7. FIG. 6 is a simplified diagram of an example template 600 for interpreting unstructured input according to some embodiments and FIG. 7 is a simplified diagram of an example of unstructured natural language input 700 according to some embodiments. And although methods 400 and 500 are described with respect to the examples of FIGS. 6 and 7, it is understood that other arrangements and/or syntaxes are possible for template 600 and that other unstructured natural language inputs may be the subject of methods 400 and 500.

At a process 405, a template is received. In some examples, the template may be prepared in advance by a developer who understands the underlying organization and schemas of the database or data store (e.g., the database managed by multi-tenant system 360) as well as the data entry and/or modification needs of a user. In some examples, the template may be received based on a selection from the user (e.g., the user of user device 310) from among a list of templates that are available for use. In some examples, the user may select the template from the list as displayed in a user interface on user device 310 by pressing a button, selecting a link, and/or the like. In some examples, the selected template may be received as part of an API call, a remote procedure call, a HTTP post, and/or the like.

In some examples, the template received may be consistent with template 600 of FIG. 6. As shown in FIG. 6, template 600 illustrates the types of information that is identified in a template, such as database tables associated with parent and child entities, types and details of actions that may be performed on the database tables, and/or the like. In more detail, entry 610 of template 600 identifies a name of template 600 as "Debrief." In some examples, debrief template 600 corresponds to a template used to analyze unstructured natural language input following a sales call. Other examples of templates may include templates for analyzing unstructured natural language input for entering a new contact, describing a new lead, and/or the like. In some examples, the name in entry 610 is the name displayed in the list of available templates displayed to the user.

Entry 620 identifies the one or more tables that are to be searched to identify a parent record that is associated with the unstructured natural language input that is analyzed according to template 600. In the examples of FIG. 6, entry 620 identifies that the parent record is to be found in an "Account" table, which may be used to store organizations and/or persons. Other examples of tables that may be associated with parent records may correspond to contacts, companies, and/or the like.

Entry 630 identifies the one or more tables that are to be searched to identify a child record that is related to the parent record and is associated with the unstructured natural language input that is analyzed according to template 600. In the examples of FIG. 6, entry 630 identifies that the child record is to be found in an "Opportunity" table, which may correspond to contacts and/or persons mentioned in the unstructured natural language input. Other examples of tables that may be associated with child records may correspond to contacts, companies, events, and/or the like.

Entry 640 identifies one or more actions or action items that correspond to the types of database changes (e.g., new record insertion, record updates, and/or the like) that may be performed based on the information in the unstructured natural language input. In the examples of FIG. 6, entry 640 identifies that actions associated with "Event Creation", "Opportunity Update", and "Task Creation" may be performed. The keywords "Creation" and "Update" indicate the type of database operation is record insertion and record update, respectively. "Event", "Opportunity", and "Task" identify the names of respective tables that are to be the subject of the insertion or update operation. Thus, entry 640 identifies that records may be inserted into the Event and Task tables and that updates may be performed in the Opportunity table.

Entry 650 identifies one or more filtering and/or ordering instructions that may be used to limit and/or organize the matching process for child records as is described in further detail below. In some examples, entry 650 may include SQL code. In the examples of FIG. 6, entry 650 indicates that child records whose "StageName" is "Closed" should be omitted and that search results should be sorted alphabetically by the "Name" field.

Entries 662-668 provide further details on the actions that may be taken as identified in entry 640. Each of entries 662-668 identifies a particular action and the parameters and/or data associated with that action. In some examples, each entry 662-668 corresponds to a signature that identifies the type/table of the record and the one or more types of data and corresponding fields they are the subject of the database change. In some examples, when each of the signatures is unique, the template may be used to uniquely identify the database change as is described in further detail below. In some examples, when two or more of the signatures are not unique, additional user input may be needed to process the action as is described in further detail below. In more detail, entry 662 identifies as an action the update of the child record in the Opportunity table where monetary information is used to update an Amount field. Similarly, entries 664 and 666 identify further actions to update the child record in the Opportunity table where date information is used to update a CloseDate field and pick list information is used to update a StageName field, respectively. In some examples, the pick list information may correspond to a known list of enumerated values that are possible for the StageName field, such as identified in the schema for the Opportunity table. Entry 668 identifies as an action the creation of a record in the Task table using person information to specify a value for a Contact field and date information to specify a value for the FollowupDate field.

Entries 670-690 identify examples of characteristics and/or features that correspond to optional actions that may be associated with template 600. In the examples of FIG. 6, template 600, entries 670 and 680 allow for insert operations on the Task and Event tables, respectively, and entry 690 indicates that the database changes may be published (e.g., the sending of notifications) to other users, organizations, and/or templates who have subscribed to such database changes.

Referring back to FIG. 4, at a process 410, unstructured audio input is received. In some examples, the unstructured audio input may be captured by a microphone of a user device, such as user device 310. In some examples, the unstructured audio input may be encoded into an audio file according to a standard audio encoding, such as an MP3 file and/or the like. In some examples, the unstructured audio input may additionally include a list of time indexes corresponding to additional user interactions with the user interface that the user may use to annotate the unstructured audio input. In some examples, the additional user interactions may include a button press and/or the like. In some examples, the annotations may correspond to a marker indicating the start of an action item and/or the like to aid in the parsing of the unstructured audio input. In some examples, the unstructured audio input may be received as part of an API call, a remote procedure call, a HTTP post, and/or the like.

At a process 415, the unstructured audio input captured during process 410 is converted to natural language text. In some examples, process 415 may be performed with the aid of a voice to text service, such as voice to text service 382. In some examples, the conversion may include using one or more neural networks and/or APIs for performing speech recognition on the unstructured audio input to recognize natural language captured in the audio. In some examples, the conversion may further include recognizing special key words or phrases and converting them into annotations and/or separators in the text. In some examples, the phrase "action item" may be replaced with a special separator indicating the start of an action item that is processed as is described in further detail below. In some examples, the list of time indexes received during process 410 may also be used to insert corresponding annotations and/or separators into the natural language text. In some examples, the natural language text may further be parsed to add appropriate white space (e.g., carriage returns, new lines, and/or the like) to separate sentences, indicated pauses and/or periods of silence in the audio, and/or the like. In some examples, process 415 may begin automatically upon receipt of the unstructured audio input during process 410 and/or occur concurrently with capturing of the unstructured audio input so that the natural language text may be displayed to the user as the user speaks.

In some examples, the natural language text may correspond to natural language text 700 of FIG. 7. As shown in FIG. 7, natural language text 700 illustrates an example of the kind of natural language text that may correspond to unstructured input related to debrief template 600. For ease of discussion, natural language text 700 is described with respect to each sentence in natural language text 700, which are shown with a blank line after each sentence. However, it is understood that different formats and/or groupings are possible. Further, without loss of generality, the processing of natural language text 700 is described with respect to each sentence; however other groupings such as phrases, paragraphs, utterances, and/or the like may also be used.

Sentences 710, 720, 730, and 760 correspond to descriptive text that is analyzed to help identify the parent and child records to be associated with the database changes identified via further analysis of the unstructured input as is described in further detail below.

Sentences 740, 750, and 770 correspond to action items identified in the unstructured input as noted by the "*" separator at the start of each action item sentence. In some examples, the "*" separators may correspond to the separators added during process 415 based on the recognized keywords or phrases and/or the list of time indexed annotations. Action item sentence 740 is an action item with date information "July 1st", action item sentence 750 includes an action item with monetary information "$250k", and action item sentence 770 includes an action item with both person information "Chris" and date information "two weeks." In some examples, indexes (e.g., character and/or word indexes) indicating the beginning and end of each of sentences 740, 750, and 770 may also be noted for use in future processing.

Referring back to FIG. 4, at a process 420, entities in the natural language text created during process 415 are identified. In some examples, process 420 may be performed with the aid of one or more entity classifiers and/or entity recognition services, such as entity service 384. In some examples, the entity recognition includes analyzing the words and phrases to identify entities discussed in the natural language text, a corresponding type of each of the entities, a corresponding value of each of the entities, a corresponding confidence level in the recognition of each of the entities and/or the type of the entities, and a corresponding index and/or range of indexes identifying where the text associated with each of the entities is found in the natural language text. In some examples, the types of entities may correspond to organizations (e.g., a company), persons, monetary amounts, percentages, dates, times, locations, and/or pick-list types. In some examples, the pick-list types may correspond to an enumeration, a set of states for an object and/or entity, and/or the like. In some examples, the entity recognition may use context information (e.g., surrounding text) to determine the confidence level in the recognition. In the examples of sentence 710 of natural language text 700, Acme may be given a higher confidence level as an organization than Chez Cuisine because Acme is introduced with "of" and Chez Cuisine is introduced with "at". In some examples, process 420 may be triggered in response to the user pressing an analyze button, link, and/or the like in the user interface. In some examples, the analyze request may be received as part of an API call, a remote procedure call, a HTTP post, and/or the like. In some examples, the results of the entity recognition may be saved for use in other processes of methods 400 and/or 500.

In some examples, the recognition of monetary amounts, percentages, dates, and/or times may recognize one or more special characters (e.g., dollar signs, euro signs, colons, percentage symbols, slashes, etc.), special letters (e.g., "k" for 1000), and/or the like. In some examples, the recognition of dates may use one or more rules for interpreting relative information such as "today", "two weeks", "one hour". "noon", and/or the like and/or incomplete information such as "July 1st" to refer to the current year unless the current date is after July 1st of the current year. In some examples, the entity recognition may further include determining a value for the entity in a standard format, such as converting dates based on the Unix epoch, times based on UTC time, and/or the like. In some examples, the recognized entities may be optionally sorted based on their confidence level, their index, their type, and/or any combination of these properties.

In the examples of natural language text 700, the entity recognition may recognize organizations corresponding to "Acme" in sentences 710 and 720, "Acme Corp" in sentence 730, "Chez Cuisine" in sentence 710, and "ABC" in sentence 760; persons corresponding to "Chris Quintana" in sentence 710 and "Chris" in sentence 770; monetary amounts of "$250k" in sentence 750; dates corresponding to "today" in sentence 710, "July 1st" in sentence 740, and "two weeks" in sentence 770; locations corresponding to "Chez Cuisine" in sentence 710 and "global" in sentence 720.

At a process 425 one or more potential parent entities in the natural language text are identified based on the template. Using the parent information included in the template, such as the one or more tables identified in entry 620, one or more searches are performed on the one or more databases and/or data stores associated with the user, the user's organization, and/or the user's tenant. In some examples, the search may only be performed for entities whose confidence value is above a configurable threshold. In some examples, the search may be performed with a search API, such as a search API provided by multi-tenant system 360. In some examples, the search may account for variant spellings, variations in words, and/or other fuzzy factors that are known in the art. In some examples, when no matching record is found for an entity of the correct type in the one or more tables specified in the template, that entity may be omitted from the list of potential parent entities.

In the examples of template 600 and natural language text 700, process 425 may recognize as potential parent entities one or more of Acme from sentences 710 and 720, Acme Corp from sentence 730, Chez Cuisine from sentence 710, and ABC from sentence 760 because each of them are recognized as organization type entities during process 420 and the Account table of entry 620 is associated with organization type entities. In some examples, the search of the Account table would identify records that match and/or partially match the potential parent entities such as "Acme Corp", Acme, Inc.", "Acme Products, Ltd.", and/or the like.

At a process 430, the potential parent entities identified during process 425 are displayed to the user. In some examples, the potential parent entities may be passed back to the user device (e.g., user device 310) in response to an initial request by the user to analyze the unstructured audio input received during process 410. In some examples, the potential parent entities may be displayed in an application, browser, and/or the like with corresponding buttons, links, and/or the like to allow the user to select the correct parent entity (and thus the correct parent record) to be associated with the unstructured input. In some examples, the potential parent entities may be sorted based on their corresponding confidence level determined during process 420, a relevance factor from the search of process 425, their corresponding index within the natural language text determined during process 420, and/or combinations of these values so as to present the potential parent entities in an organized fashion.

At a process 435, a selection of a parent entity is received. In some examples, the selection of the parent entity (and thus the corresponding parent record) may be received in response to the user pressing a button, activating a link, and/or the like associated with the selected parent entity. In some examples, the selection of the parent entity may be received as part of an API call, a remote procedure call, a HTTP post, and/or the like.

At a process 440 one or more potential child entities in the natural language text are identified based on the template and the parent entity selected during process 435. Using the child information included in the template, such as the one or more tables identified in entry 630, one or more searches are performed on the one or more databases and/or data stores associated with the user, the user's organization, and/or the user's tenant. In some examples, the search may only be performed for entities whose confidence value is above a configurable threshold. The search is limited to records in the one or more tables that are associated with the parent entity/record selected during process 435 so that child entities associated with other parent records are not also included in the potential child entities. In some examples, the search may be performed with a search API, such as a search API provided by multi-tenant system 360. In some examples, the search may account for variant spellings, variations in words, and/or other fuzzy factors that are known in the art. In some examples, when no matching record is found for an entity of the correct type in the one or more tables specified in the template, that entity may be omitted from the list of potential child entities. In some examples, one or more filter and/or ordering criteria may be used to further limit the child entities included in the potential child entities.

In the examples of template 600 and natural language text 700, process 440 may recognize as potential child entities one or more of Chris Quintana from sentence 710 and Chris from sentence 770 because each of them are recognized as person type entities during process 420 and the Opportunities table of entry 630 is associated with person type entities. In some examples, the search of the Opportunities table would identify records that match and/or partially match the potential child entities such as "Chris Quintana", "Chris Jones", "David Christian", and/or the like. In addition, entry 650 may be used to limit the number of potential child entities identified and control the ordering of how the potential child entities are ordered. For example, according to entry 650, child records whose StageName field has a value of "Closed" would be omitted from the results, and the results would be sorted alphabetically by the Name field, such as the order "David Christian", "Chris Jones", and "Chris Quintana".

At a process 445, the potential child entities identified during process 440 are displayed to the user. In some examples, the potential parent entities may be passed back to the user device (e.g., user device 310) in response to an initial request by the user to analyze the unstructured audio input received during process 410. In some examples, the potential child entities may be displayed in an application, browser, and/or the like with corresponding buttons, links, and/or the like to allow the user to select the correct child entity (and thus the correct child record) to be associated with the unstructured input. In some examples, the potential child entities may be sorted according to ordering information included in the template (e.g., entry 650) and/or alternatively based on their corresponding confidence level determined during process 420, a relevance factor from the search of process 425, their corresponding index within the natural language text determined during process 420, and/or combinations of these values when ordering information is not included in the template.

At a process 450, a selection of a child entity is received. In some examples, the selection of the child entity (and thus the corresponding child record) may be received in response to the user pressing a button, activating a link, and/or the like associated with the selected child entity. In some examples, the selection of the child entity may be received as part of an API call, a remote procedure call, a HTTP post, and/or the like.

At a process 455, each action item in the natural language text from process 415 is processed. In some examples, each of the action items may be processed by iterating through the action items in the natural language text and processing each action item in turn using method 500 as is described in further detail below. In some examples, each of the action items may be recognized by its corresponding action item separator inserted into the natural language text during process 415. In the examples of natural language text 700, three action items corresponding respectively to sentences 740, 750, and 760 are processed during process 455.

Referring now to FIG. 5, at a process 505, natural language text corresponding to an action item is extracted. In some examples, the indexes indicating the beginning and the ending of the action item (e.g., as determined during process 415) are used to extract the natural language that corresponds to the action item from the rest of the natural language text that forms the complete unstructured input. In some examples, the extraction may include one or more of a substring operation, extraction of words from the sequence of words in the unstructured input, and/or the like.

At a process 510, an intent of the action item is determined. In some examples, process 510 may be performed with the aid of an intent classifier and/or intent service, such as intent service 386. In some examples, the intent recognition includes analyzing the words and phrases to identify the type of database and/or data store change intended by the user in the natural language text of the action item and optionally a confidence level in the classification of the intent. In some examples, the intent may be selected from a class of intents associated with desired data changes to a database and/or data store. In some examples, the class of intents may include one or more of inserting an entry (e.g., a record) in a database table, updating one or more fields of an entry (e.g., a record) in a database table, and/or the like.

At a process 515, entities in the natural language text of the action item are identified. In some examples, the results of the entity recognition of process 420, which were previously saved, are used to identify each of the entities, the type of the entities, the values of the entities, and the confidence level in the identifications of each of the entities located within the indexes that correspond to the natural language text of the action item. In some examples, one or more entity recognition services, such as entity service 384 may be used to identify each of the entities, the type of the entities, and the confidence level in the identifications.

At a process 520, the entities and the intent of the action item are matched based on the template. The intent of the action item as determined during process 510 is compared to the action items (e.g., database changes) that are permitted by the template. For example, an action item whose intent is determined to be a record update may only be matched to action items that include a record update and an action item whose intent is determined to be a record creation may only be matched to action items that include a record creation. Additionally, the types of entities identified in the action item during process 515 are matched to the types included with the signatures for action items specified in the template. Thus, each action item is matched by intent and types of entities to one or more of the action items signatures in the template. In some examples, where there are more entities within the action item than specified in a corresponding signature (e.g., a signature includes a date and a time and the natural language text for the action item includes a date, a time, and a person entity), the action item may be matched to that signature. In some examples, when the intent and types of entities match multiple signatures, the match with the greatest strength may be selected and/or each of the matches may be noted for further input by the user. In some examples, the greatest strength may be determined by combining the confidence levels of the intent and the entity identifications using an aggregation function such as max, multiplication, and/or other triangular norm function.

In the examples of template 600 and natural language text 700, sentence 740 may be matched to the signature of entry 664 because the intent is to update an Opportunity record (e.g., the child record) and the natural language text includes an entity "July 1st", which is of type date; sentence 750 may be matched to the signature of entry 662 because the intent is to update an Opportunity record and the natural language text includes an entity "$250k", which is of type monetary amount; and sentence 770 may be matched to the signature of entry 668 because the intent is create a task record and the natural language text includes an entity "Chris", which is of type person and an entity "two weeks", which is of type date.

At a process 525, the potential action to perform is displayed to the user. In some examples, the potential action may be passed back to the user device (e.g., user device 310). In some examples, the potential action may be displayed in an application, browser, and/or the like with corresponding buttons, links, and/or the like to allow the user to confirm and/or reject that the potential action is the correct action. In some examples, the potential action may optionally be displayed with the corresponding natural language text to aid the user in the confirmation process.

At a process 530, a confirmation of the potential action is received. In some examples, the confirmation of the potential action may be received in response to the user pressing a button, activating a link, and/or the like to indicate the confirmation. In some examples, the confirmation of the potential action may be received as part of an API call, a remote procedure call, a HTTP post, and/or the like. In some examples, when the user does not confirm the potential action, method 500 may return to process 520 to do more matching or may abort without performing the action item and without any database changes occurring.

At a process 535, a database query based on the confirmed action is generated. In some examples, the database query may be a SQL query. In some examples, an action item associated with creation of a record may generate an "INSERT" query and an action item associated with update of a record may generate an "UPDATE" query. In some examples, when the action item is an update of a record, the corresponding child record is updated with the new data values associated with the entities identified from the natural language text during process 515. In some examples, when the action item is a creation of a record, the record is added to the table identified in the matching signature for that action item and is associated with the parent and child records as selected by processes 435 and 450, respectively.

In the examples of template 600 and natural language text 700, sentence 740 would result in a database query to update the child Opportunity record to set the CloseDate field to July 1st; sentence 750 would result in a database query to update the child Opportunity record to set the Amount field to $250,000; and sentence 760 would result in a database query to insert a record into the Task table where the Contact field is set to Chris, the FollowupDate field is set to a date two weeks in the future, and the new record is associated with the parent and child records as selected during processes 435 and 450, respectively.

At a process 540, the database is changed using the database query determined during process 535. In some examples, the database query may be provided to a database system (e.g., multi-tenant system 360) using one or more APIs, remote procedure calls, and/or the like. In some examples, proper data access may be ensured by including a previously determined connection string and/or authentication credentials, such as may be provided by authentication service 344.

Referring back to FIG. 4, upon completion of process 455, method 400 may be repeated to process additional unstructured audio input using the same template or a different template depending upon the nature and content of the additional unstructured input.

As discussed above and further emphasized here, FIGS. 4 and 5 are merely examples which should not unduly limit the scope of the claims. One of ordinary skill in the art would recognize many variations, alternatives, and modifications. According to some embodiments, methods 400 and/or 500 may include additional and/or variant processes. In some examples, processes 410 and 415 may be replaced with an alternative process where the user types and/or otherwise enters the text on user device 310, such as using a text editor and/or the like.

In some examples, when matches to multiple signatures occur during process 520, processes 525 and 530 may be modified to display a list of corresponding potential actions (either collectively or iteratively) and the confirmation of the potential action includes the selection of the correct potential action. In some examples, the potential actions may be sorted according to the results of the aggregation function and the aggregation function results may optionally be displayed.

In some examples, method 400 may include an additional process after process 415, where the natural language text (with or without the separators) is displayed to the user so that the user may edit the text to correct misspellings and/or other errors introduced by the speech recognition process.

In some examples, method 400 may include an additional process where the unstructured audio input and/or the text is stored in the child record, such as in a file object, a binary large object (BLOB), and/or the like.

In some examples, method 400 and/or 500 may include an additional process to publish the database changes made to users who have subscribed to such changes and as permitted by the template (e.g., using an entry 690). In some examples, the publication may include sending one or more email messages, social media messages, and/or the like.

Some examples of computing devices, such as users systems 112, database system 116, user device 310, server 330, multi-tenant system 360, and/or support server 370 may include non-transitory, tangible, machine-readable media that include executable code that when run by one or more processors (e.g., processor system 112A, processor system 117, processor 332, and/or processor 372) may cause the one or more processors to perform the processes of methods 400 and/or 500. Some common forms of machine readable media that may include the processes of methods 400 and/or 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A method for natural language processing, the method comprising:
    receiving, by one or more processors of a server, unstructured text input;
    receiving, by the one or more processors, a template for interpreting the unstructured text input;
    identifying, using an entity classifier, entities in the unstructured text input including a type of each of the entities, a value of each of the entities, and a confidence level in the identifying, wherein the type of each of the entities is selected from a group consisting of an organization, a person, a date, a time, a percentage, a monetary value, and a pick list type;
    identifying, by the one or more processors, one or more potential parent entities from the identified entities based on the template;
    receiving, by the one or more processors, a selection of a parent entity from the one or more potential parent entities;
    identifying, by the one or more processors, one or more potential child entities from the identified entities based on the template and the selected parent entity;
    receiving, by the one or more processors, a selection of a child entity from the one or more potential child entities;
    identifying, by the one or more processors, an action item in the unstructured text input based on the identified entities and the template;
    determining, using an intent classifier, an intent of the action item; and
    updating a data store based on the determined intent, the identified entities, and the selected child entity.

2. The method of claim 1, wherein updating the date store is further based on the selected parent entity.

3. The method of claim 1, wherein updating the data store based on the determined intent, the identified entities, and the selected child entity comprises:
    matching the determined intent and types of one or more entities identified in the action item to an action item signature in the template; and
    generating a database query based on the action item signature and values of the one or more entities identified in the action item.

4. The method of claim 3, wherein a field from a record in the data store to include in the database query is identified in the template by a type of a corresponding entity identified in the action item.

5. The method of claim 1, wherein:
    identifying the one or more potential parent entities comprises searching in records of one or more parent tables in the data store for values matching one or more of the identified entities having a type matching a type of the one or more parent tables; and
    the one or more parent tables are identified in the template.

6. The method of claim 1, wherein:
    identifying the one or more potential child entities comprises searching in records of one or more child tables in the data store for values matching one or more of the identified entities having a type matching a type of the one or more child tables;
    the one or more child tables are identified in the template; and
    the records are associated with a record corresponding to the selected parent entity.

7. The method of claim 6, wherein identifying the one or more potential child entities further comprises one or more of:
    filtering the records based on a filter in the template; or
    ordering the one or more potential child entities based on an ordering specified by the template.

8. The method of claim 1, further comprising publishing changes to the data store based on the updating.

9. The method of claim 1, wherein:
    the unstructured text input is received as audio input; and
    the method further comprises performing speech recognition on the audio input.

10. A non-transitory machine-readable medium comprising executable code which when executed by one or more processors associated with a computing device are adapted to cause the one or more processors to perform a method comprising:
    receiving unstructured text input;
    receiving a template for interpreting the unstructured text input;
    identifying, using an entity classifier, entities in the unstructured text input including a type of each of the entities, a value of each of the entities, and a confidence level in the identifying, wherein the type of each of the entities is selected from a group consisting of an organization, a person, a date, a time, a percentage, a monetary value, and a pick list type;

identifying one or more potential parent entities from the identified entities based on the template;

receiving a selection of a parent entity from the one or more potential parent entities;

identifying one or more potential child entities from the identified entities based on the template and the selected parent entity;

receiving a selection of a child entity from the one or more potential child entities;

identifying an action item in the unstructured text input based on the identified entities and the template;

determining, using an intent classifier, an intent of the action item; and updating a data store based on the determined intent, the identified entities, and the selected child entity.

11. The non-transitory machine-readable medium of claim 10, wherein updating the data store based on the determined intent, the identified entities, and the selected child entity comprises:

matching the determined intent and types of one or more entities identified in the action item to an action item signature in the template; and generating a database query based on the action item signature and values of the one or more entities identified in the action item.

12. The non-transitory machine-readable medium of claim 11, wherein a field from a record in the data store to include in the database query is identified in the template by a type of a corresponding entity identified in the action item.

13. The non-transitory machine-readable medium of claim 10, wherein:

identifying the one or more potential parent entities comprises searching in records of one or more parent tables in the data store for values matching one or more of the identified entities having a type matching a type of the one or more parent tables; and the one or more parent tables are identified in the template.

14. The non-transitory machine-readable medium of claim 10, wherein:

identifying the one or more potential child entities comprises searching in records of one or more child tables in the data store for values matching one or more of the identified entities having a type matching a type of the one or more child tables;

the one or more child tables are identified in the template; and the records are associated with a record corresponding to the selected parent entity.

15. A computing device comprising:

a memory storing a plurality of processor-executable instructions for natural language processing; and one or more processors coupled to the memory and executing the plurality of processor-executable instructions from the memory to:

receive unstructured text input;

receive a template for interpreting the unstructured text input;

identify, using an entity classifier, entities in the unstructured text input including a type of each of the entities, a value of each of the entities, and a confidence level in the identifying, wherein the type of each of the entities is selected from a group consisting of an organization, a person, a date, a time, a percentage, a monetary value, and a pick list type;

identify, one or more potential parent entities from the identified entities based on the template;

receive a selection of a parent entity from the one or more potential parent entities;

identify one or more potential child entities from the identified entities based on the template and the selected parent entity;

receive a selection of a child entity from the one or more potential child entities;

identify an action item in the unstructured text input based on the identified entities and the template;

determine, using an intent classifier, an intent of the action item; and update a data store based on the determined intent, the identified entities, and the selected child entity.

16. The computing device of claim 15, wherein to update the data store based on the determined intent, the identified entities, and the selected child the one or more processors further execute instructions from the memory:

match the determined intent and types of one or more entities identified in the action item to an action item signature in the template; and generate a database query based on the action item signature and values of the one or more entities identified in the action item.

17. The computing device of claim 15, wherein:

to identify the one or more potential parent entities the one or more processors further execute instructions from the memory to search in records of one or more parent tables in the data store for values matching one or more of the identified entities having a type matching a type of the one or more parent tables; and the one or more parent tables are identified in the template;

to identify the one or more potential child entities the one or more processors further execute instructions from the memory to search in records of one or more child tables in the data store for values matching one or more of the identified entities having a type matching a type of the one or more child tables;

the one or more child tables are identified in the template; and the records are associated with a record corresponding to the selected parent entity.

* * * * *